(12) United States Patent
Rasmussen

(10) Patent No.: US 9,643,112 B2
(45) Date of Patent: May 9, 2017

(54) SECTOR PART OF A FILTERING, PREFERABLY ROTATING DISK

(76) Inventor: Johan Rasmussen, Vallentuna (SE)

(*) Notice: Subject to any disclaimer, the term of this patent is extended or adjusted under 35 U.S.C. 154(b) by 828 days.

(21) Appl. No.: 13/885,980

(22) PCT Filed: Nov. 16, 2011

(86) PCT No.: PCT/SE2011/000207
§ 371 (c)(1),
(2), (4) Date: Jun. 25, 2013

(87) PCT Pub. No.: WO2012/067561
PCT Pub. Date: May 24, 2012

(65) Prior Publication Data
US 2013/0264270 A1   Oct. 10, 2013

(30) Foreign Application Priority Data
Nov. 17, 2010   (SE) ...................................... 1001115

(51) Int. Cl.
*B01D 33/23*   (2006.01)

(52) U.S. Cl.
CPC .................................. *B01D 33/23* (2013.01)

(58) Field of Classification Search
CPC .................................................. B01D 33/23
USPC .... 210/399, 331, 493.1, 499, 161, 486, 227, 210/231, 346, 347, 324, 327, 329, 354, 210/356, 357
See application file for complete search history.

(56) References Cited

U.S. PATENT DOCUMENTS

| 4,162,982 A | 7/1979 | Chesner |
| 5,084,174 A | 1/1992 | Perälä |
| 5,647,982 A * | 7/1997 | Haythornthwaite ... B01D 33/23 210/346 |

(Continued)

FOREIGN PATENT DOCUMENTS

| SE | 460523 B  | 10/1989 |
| SE | 528180 C2 | 9/2006  |

OTHER PUBLICATIONS

International Search Report for International Application No. PCT/SE2011/000207, mail date Feb. 2, 2012, 3 pages.

*Primary Examiner* — Madeline Gonzalez
(74) *Attorney, Agent, or Firm* — Foley & Lardner LLP

(57) ABSTRACT

The invention relates to sector part of a filtering, preferably rotating disk. The sector part includes a centrally located, relatively stiff and rigid support 1; 12 for transport of liquid therethrough and a substantially sealing edge with the exception of one or more fluid discharges 6. The sector part further comprises on both sides of sector support 1; 12 applied, filtering set ups of fine meshed nets, or made of other finely perforated materials performed or equivalent separating means 3, 4; 32, 42 for capturing and separating of fibers and/or particles from a mixture of fibers and/or particles and fluid. The aims of the invention are to capture and separate the fibers and/or particles from a mixture of fibers and/or particles and fluid. One important aspect of the invention characteristic is that each of said separating means 3, 4; 32, 4 is applied loosely and is movable held relative the support 1; 12 and relative to the sealing edge 2; 22. The separating means are fixed essentially perpendicular to its main plane by holding means 5; 52; 32a.

18 Claims, 3 Drawing Sheets

(56) References Cited

U.S. PATENT DOCUMENTS

Figure 1:
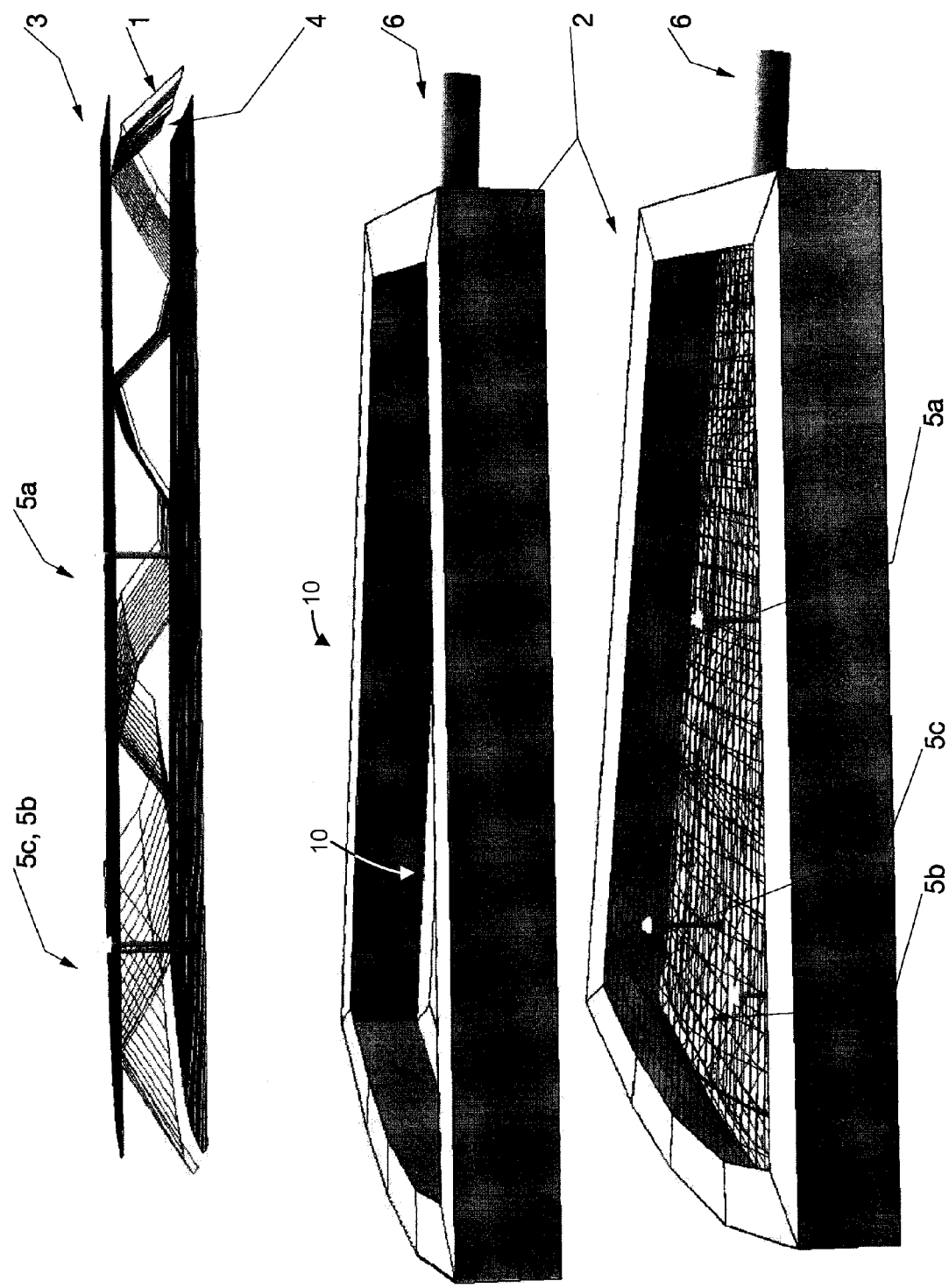

| | | | |
|---|---|---|---|
| 2005/0082217 A1* | 4/2005 | Hagg | B01D 33/23 210/331 |
| 2005/0284594 A1* | 12/2005 | Nykanen | B07B 1/00 162/55 |
| 2006/0261001 A1* | 11/2006 | Hagg | B01D 33/23 210/486 |

* cited by examiner

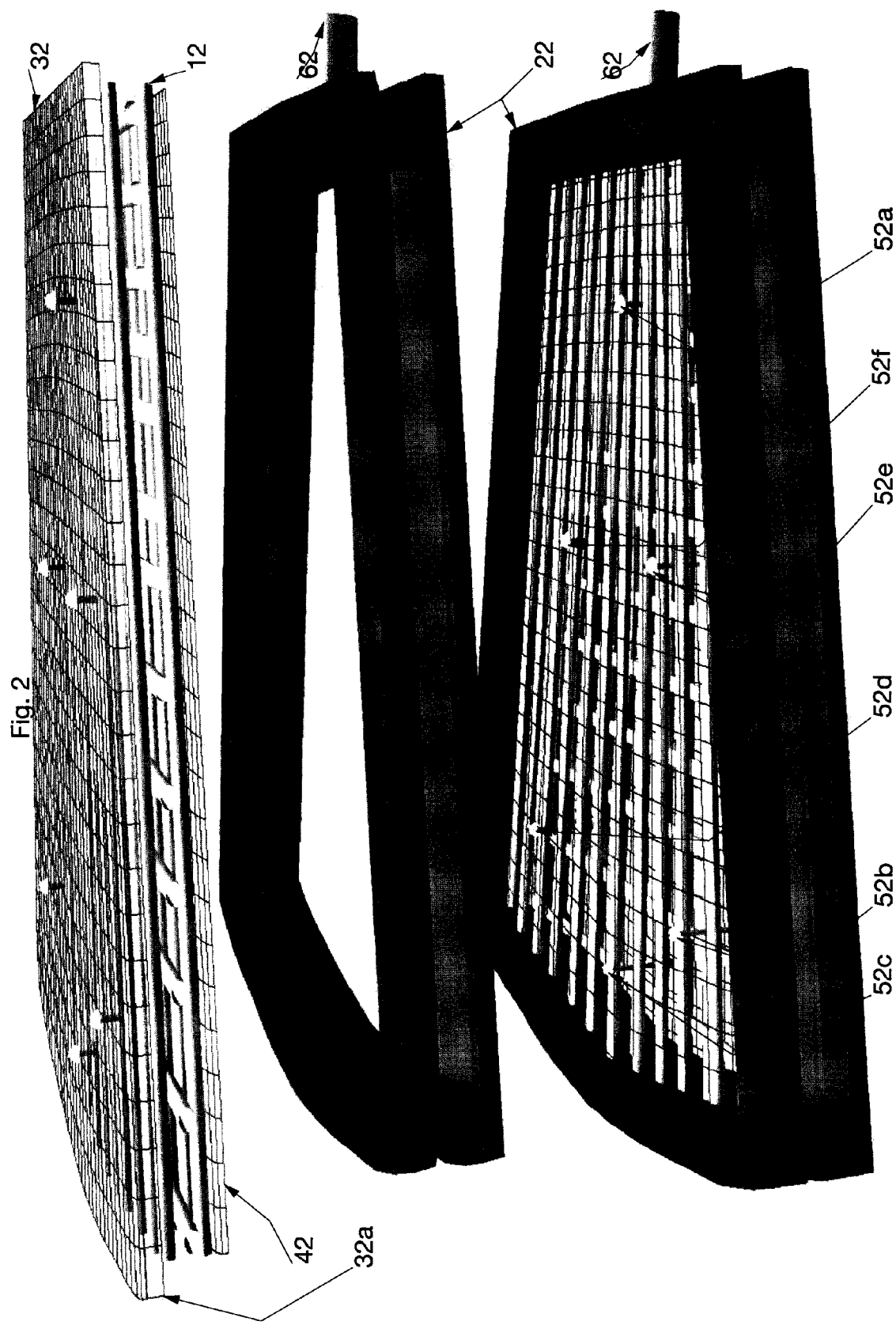

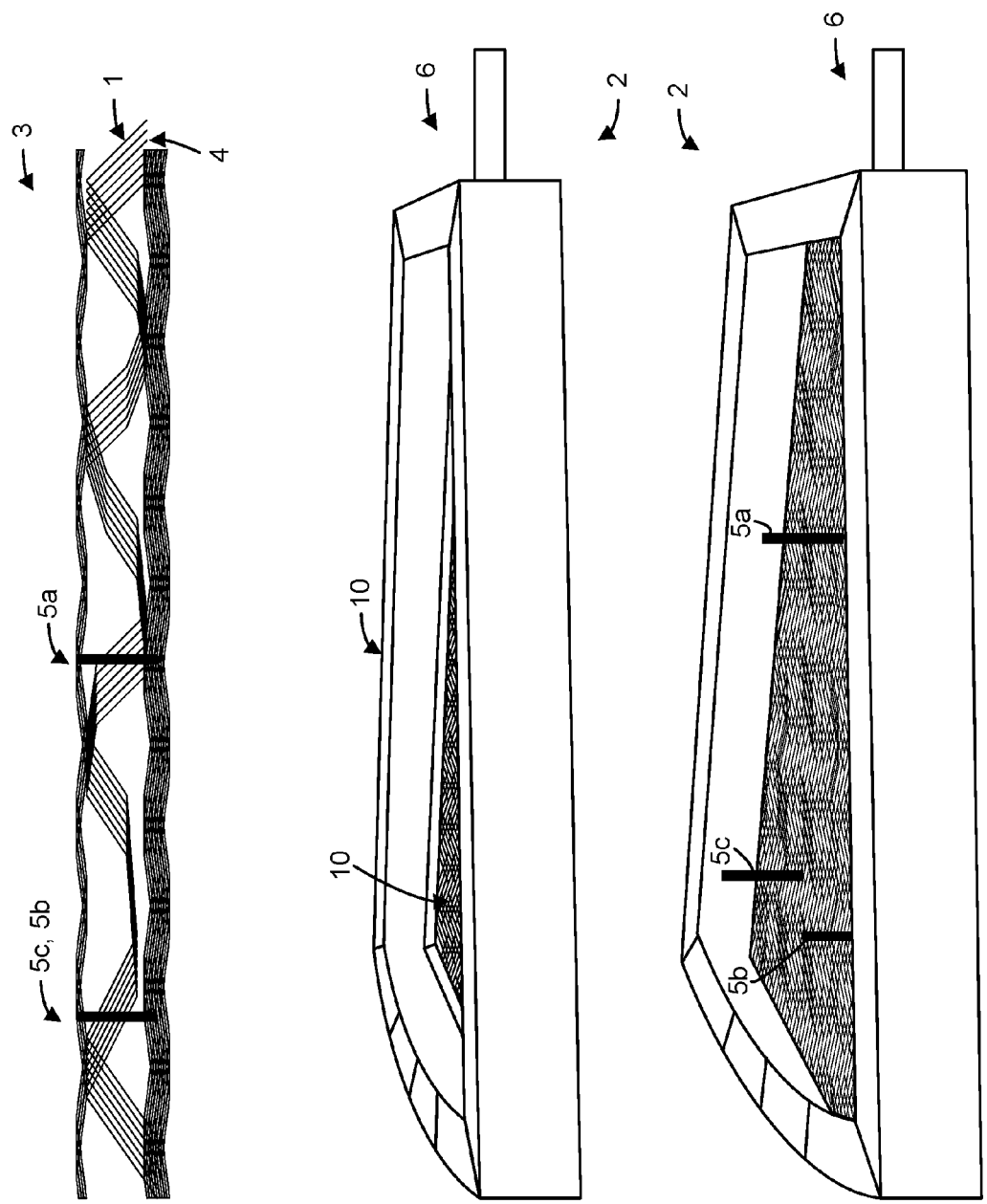

SECTOR PART OF A FILTERING, PREFERABLY ROTATING DISK

The invention relates to a sector part of a filtering, preferably rotating disk. Said sector part includes a centrally therein located, relatively stiff and rigid support for transport of liquid therethrough. Said sector part has a substantially sealing edge with the exception of one or more fluid discharges. Said sector part has also on either side of a sector support applied, filtering set ups of nets made of small meshes or of otherwise finely perforated materials having equivalent designed functionality means for capturing and separating of fibres and/or of particles from a mixture of fibres and/or particles and fluid.

For example, when nets having small meshes or made of finely perforated steel plates are used at or on the sector parts for filtering purposes, they have hitherto been fixed relative the sector part in various ways, for example by means of welding, clamping, gluing, and so on.

The disadvantages with such fixed or stationary attachments of nets having small meshes and of finely perforated materials, respectively, relative to a sector part are many, for example, they can change shape and/or size due to the pressure, weight, temperature, rotation and/or other variations in working conditions occurring during filtration and removal of such aggregated fibres and/or particles from the liquid permeable means. The costs for all attachments, such as the generation of a large number of welding spots, will be relatively high, fatigue problems will often and quickly occur between each attachment point for the net or for the finely perforated steel plate and the adjacent sector part—especially if thin nets having fine meshes or finely perforated plates of stainless steel are used —, tolerance problems will occur during application of replacement parts on older, existing sector parts, since they may have or have acquired dimensions deviating from assumed dimensions, and so on.

The aim of the present invention is to reduce or completely eliminate the above specified disadvantages at the sector part as described in the preamble of the specification and has been solved according to the invention in such a way that each of said capturing and separating means is applied loosely and movably relative to the support and relative to the sealing edge of the main plane of the capturing and separating means parallel to a main part of the sector part to such an extent that when exposed to different working conditions and to potentially generated movements will not be repressed in motion in any significant degree but is fixed essentially perpendicular to its main plane by means of adapted holding means.

Further and closer details of the invention are disclosed partly by the description below together with or separated from the accompanying drawings, and partly also by the subsequent patent claims.

FIG. 1 shows, in a perspective view, a first embodiment of a sector part as seen with separated details from above and below, said details are shown in a composed sector part. FIG. 2 shows a second embodiment of a sector part also seen from above with separated details and below as a composed sector part. FIG. 3 shows a third embodiment of a sector part also seen from above with separated details and below as a composed sector part.

The sector part according to FIG. 1 includes for example a sealing edge, here shown as an essentially U-shaped edge 2, with one or more liquid discharges 6, only one is, however, shown in the drawing. Between the two shanks 10 of the U-shaped edge 2 and centrally in the sector part is a support 1 located, which as an example may constitute of one net 1, permitting a central fluid transfer, which net is made of coarse meshes and stiff, which net is preferably pleated or folded, as shown especially at the top of FIG. 1. On either side of the coarse meshed support 1, two nets 3, 4, composed of fine meshes, or two finely perforated plates are located in order to intercept or capture fibres and/or particles from a liquid solution that is administered from the outside of the respective finely meshed nets 3, 4 or the respective perforated sheet materials. These nets 3, 4 composed of small or fine meshes and the net 1 with coarse meshes, the support net, are also mutually kept with help of an appropriate number of holding means 5a-5c. Said last mentioned holding means 5a-5c, which are running through the nets 3, 4 or through the finely perforated plates and through the support net 1, are designed so small compared to the small meshed nets 3, 4 or the finely perforated plates that they can move somewhat either together or individually, and in relation to the relatively coarse meshed support net 1 and in relation to and relative to the sealing edge 2 at the working and/or temperature variations which they are expected to be exposed to, for example, about 15 to 100 degrees Celsius.

In the lower part of FIG. 1, the sector part is shown with its constituent parts 1, 2, 3, 4, 5, and 6 according to the upper portion of FIG. 1 aggregated to a complete sector part. Support net 1 is here matched in size essentially corresponding to the size of the plane between the bottomed insides of the U-shaped edge 2 while the small or fine meshed nets 3 and 4 or the finely perforated steel plates in size are adapted to have a certain required clearance for example a few millimetres in relation to the size of the plane between the bottomed insides of the U-shaped edge 2. Furthermore, the internal distance between the two shanks 10 of the U-shaped edge 2 is adapted to essentially equals the total distance from the fine meshed net 3 or from the outer surface of the finely perforated plate via support net 1 to the fine meshed net 4 or to the outer surface of the finely perforated plate so that only a low clamping force is possibly achieved by the two internal shank 10 surfaces of the U-shaped edge 2 against said fine meshed nets 3, 4 and against said finely perforated steel sheets, respectively, i.e. the shanks 10 do not inhibit the movement of each plane of the small meshed nets 3 and 4 or of the finely perforated plates in any significant amount on the part of the sector in question at the actual operating temperatures or other working conditions.

In such a way, each of said small or fine meshed nets 3, 4 or each of the finely perforated steel plates is each adapted and held mainly loose and movable relative to the coarse meshed support 1 and relative to the essentially U-shaped edge 2 of the main plane of the net or steel plate parallel to a main plane of said sector part. Said movability is adapted to be permitted to such a degree that the respective small meshed nets 3 or 4 or each finely perforated plates is not restricted in movement and/or is not changing shape in a significant degree by different working temperatures or by exposed conditions. In contrast thereto, the respective fine meshed nets 3 or 4 or each finely perforated plate is attached or fixed mainly perpendicular to its main plane by means of holding means 5, the number and configurations of which can vary greatly, for example, three of them according to the FIG. 1. It should be noted here that the part of each holding means 5a and so on which passes through the nets or the perforated plates 3, 1 and 4 is adapted appropriate in size in relation to at least the mesh size of support net 1 such that a movement is permitted in relation to said support net but preferably also in relation to the small meshed nets 3 and 4 or the finely perforated steel sheets by providing slightly larger holes than actually required for the through running parts of the holding means 5a and so on.

The above specified embodiment results in that the fine meshed nets 3, 4 and the finely perforated steel plates or those means designed with equivalent functionality, providing capturing and separating, are held in place in the sector part and in that they can move in the main plane of the sector part in relation to the U-shaped edges 2 without creating any bubbles or equivalent deformations or variations in the fine meshed nets 3, 4 or in the capturing and separating means due to fixed or welded anchoring thereof. Even the sizes of the small meshed nets 3, 4 or the sizes of the capturing and separating means—manufacturing tolerances—will be less significant in relation to existing supports of previously known sector parts due to that the shanks 10 of the U-shaped edge 2 allow relatively large variations in size.

The U-shaped edge 2 indicated may consist of one single detail or can be composed of, for example, two mutually mirrored and L-shaped profiles, which can be located at a mutual distance, tight against each end edges or could be localized overlapping. The curved shape of the sector portion on one side as indicated in FIG. 1 can relatively easy be achieved by a number of slits cut out in the U-shaped profiles such as those indicated with lines in FIG. 1 or in the L shaped profiles such that they can be bent on site to accommodate to an existing, arched edge of the sector part.

The fine meshed nets 3, 4, the finely perforated steel plates or the capturing and separating means can be made of e.g. stainless steel, aluminum, other metals or of a perforated sheet material or of other suitable plastic material. The U- or L-shaped profiles can be made of various metals or of suitable plastic material and of adapted plastic materials.

FIG. 2 shows a second embodiment of the invention in which the U-shaped fluid sealing edge profile 2 as shown in FIG. 1 has been replaced by a W-like sealing edge profile 22 with spaces for one, two or more turned over or folded edges, see, for example 32a, of the small meshed nets 32, 42 or of the capturing and separating means for adapting to movements generated by potentially changing working conditions and/or temperatures. Thereby is attained that the small meshed nets 32 and 42 or the capturing and separating means are kept reasonably in position relative to the W-shaped edge profile 22 permitting certain material movement by the fine meshed nets 32 and 42 respectively by the capturing and separating means. Here, rods located at right angles and in different levels are instead indicated as a sector support and fluid permeable structure 12. Holding means 52a-52f have been organized in a larger number, sex, relative to the embodiment shown in FIG. 1 and two or more edges—turned over preferably about ninety degrees —, of which edges only 32a is shown in FIG. 2, can solely and/or together with other holding means 52a-52f also act as detention means for the fine meshed nets 32 and 42 respectively for the said finely perforated steel plates or the capturing and separating means.

FIG. 3 illustrates a non-limiting example of an exemplary embodiment of the present disclosure where the fine meshed nets 3, 4 are shown to be pleated. It is understood that FIG. 3 is provided to illustrate only one embodiment. However, it is similarly understood that the fine meshed nets 3, 4 may be pleated in other embodiments shown and described herein.

It is also within the scope of the invention to expose the sector parts of the invention for simulated working conditions prior to use them and that said holding means 5, 52, 32a and/or parts thereof in connection with said simulation are fixed relative to the sector part and/or relative to said fine meshed nets 3; 4; 32, 42 and said perforated plates, respectively.

The invention is described above utilized substantially with fine meshed nets, but it can also use other kinds of separating, finely perforated materials, for example shaped from punched steel plates or from cut and stretched metal sheets. These separating means can also be flat or pleated or may consist of combinations thereof.

The invention claimed is:

1. A sector part of a filtering, rotating disk, comprising:
   a stiff and rigid support for transport of liquid therethrough, the support being centrally located in the sector part;
   a sealing edge having one or more fluid discharges, the sealing edge having a first shank and a second shank at least substantially opposite the first shank; and
   a first portion of finely perforated material and a second portion of finely perforated material separate from the first portion of finely perforated material, the first portion positioned on a first side of the sector support and the second portion oppositely disposed from the first portion and positioned on a second side of the sector support, the finely perforated material adapted for capturing and separating at least one of fibers and particles from a mixture of at least one of fibers, particles, and fluid;
   wherein each of said first portion and second portion of finely perforated material is applied loosely and movably relative to the support and relative to the sealing edge in a main plane of each of the first portion and second portion of finely perforated material, and parallel to a main plane of the sector part, to such an extent that when exposed to different working conditions and to potentially generated movements, the finely perforated material is not repressed in any significant degree and is separate from the support;
   wherein the first portion of finely perforated material is fixed to the second portion of finely perforated material by adapted holding mechanisms that are arranged essentially perpendicular to the main plane of at least one of the first portion and second portion of finely perforated material; and
   wherein the first portion of finely perforated material and the second portion of finely perforated material are at least partially surrounded by the first and second shanks of the sealing edge.

2. The sector part according to claim 1, wherein each of the first portion and the second portion of finely perforated material is movable relative to the sealing edge.

3. The sector part according to claim 1, wherein said support comprises a pleated net with coarse mesh openings.

4. The sector part according to claim 1 with said sealing edge designed essentially as an inwards, towards the sector part targeted U-shaped sealing edge, and
   wherein said U-shaped sealing edge comprises the first and second shanks, and
   wherein the distance between the shanks of the essentially U-shaped sealing edge corresponds essentially to the distribution or thickness of the finely perforated material as seen at right angles to its main plane.

5. The sector part according to any of the previous claims, wherein each of said first portion and second portion of finely perforated material in its main plane has a smaller area than the propagation of the sector part in a plane substantially parallel to the main plane of each of the first portion and second portion of finely perforated material.

6. The sector part according to claim 5, wherein said smaller area is generated, in whole or in part, by components thereof folded away and in that the sealing edge is shaped with spaces, which allow escape of such folded away parts, without preventing or inhibiting movements of the finely perforated material except where necessary in an adapted limit position against the support.

7. The sector part according to claim 1, wherein the holding mechanisms are so located and dimensioned to permit said movements.

8. The sector part according to claim 1, characterized in that the working conditions of the sector part are so presimulated that said holding mechanisms are allowed to be fixed relative to said sector part and relatively to the finely perforated material prior to actual use.

9. The sector part according to claim 4, wherein the essentially U-shaped sealing edge comprises two mutually mirrored L-shaped profiles located at a mutual distance, and positioned tightly against each other at end edges or located with overlapping end edges.

10. The sector part according to claim 1, wherein at least one of the first portion and the second portion of finely perforated material is pleated.

11. The sector part according to claim 3 wherein said at least one of the first portion and the second portion of finely perforated material is pleated.

12. The sector part according to claim 1 wherein at least one of the first portion and the second portion of the finely perforated material comprises a fine mesh.

13. The sector part according to claim 1 wherein at least one of the first portion and the second portion of the finely perforated material comprises a finely perforated plate.

14. The sector part according to claim 1 wherein the support comprises a plurality of rods positioned and configured relative to one another in such a way to provide a fluid permeable structure.

15. The sector part according to claim 1 wherein the sealing edge comprises an inwards, towards the sector part targeted W-shaped sealing edge adapted to accommodate a folded edge portion of the finely perforated material.

16. A sector part of a filtering, rotating disk, comprising:
a stiff and rigid support for transport of liquid therethrough, the support being centrally located in the sector part;
a sealing edge, the sealing edge having one or more fluid discharges, a first shank, and a second shank at least substantially opposite the first shank; and
a first portion of finely perforated material and a second portion of finely perforated material positioned separate from the first portion of finely perforated material, wherein one of the first portion and the second portion of finely perforated material is on each side of the sector support, the first portion and the second portion of finely perforated material adapted for capturing and separating at least one of fibers and particles from a mixture of at least one of fibers, particles, and fluid;
wherein each of the first portion and the second portion of the finely perforated material has a smaller area in a main plane than the propagation of the sector part in a plane substantially parallel to the main plane of the finely perforated material;
wherein each of the first portion and second portion of finely perforated material is applied loosely and movably relative to the support and relative to the sealing edge to such an extent that when exposed to different working conditions and to potentially generated movements, the finely perforated material is not repressed in any significant degree and is separate from the support; and
wherein the first portion of finely perforated material and the second portion of finely perforated material are at least partially surrounded by the first and second shanks of the sealing edge.

17. The sector part according to claim 16 wherein the first portion of finely perforated material is fixed to the second portion of finely perforated material by adapted holding mechanisms that are arranged essentially perpendicular to the main plane of at least one of the first portion and the second portion of finely perforated material.

18. The sector part according to claim 16 with said sealing edge designed essentially as an inwards, towards the sector part targeted U-shaped sealing edge, and
wherein said U-shaped sealing edge comprises the first and second shanks, and
wherein the distance between the shanks of the essentially U-shaped sealing edge corresponds essentially to the distribution or thickness of the finely perforated material, as seen at right angles to its main plane.

* * * * *